United States Patent [19]

McNulty

[11] Patent Number: 4,731,205
[45] Date of Patent: Mar. 15, 1988

[54] RANDOM PACKING FOR FLUID CONTACT DEVICES AND METHOD OF PREPARING SAID PACKING

[75] Inventor: Kenneth J. McNulty, Salem, N.H.

[73] Assignee: Koch Engineering Company, Inc., Wichita, Kans.

[21] Appl. No.: 904,986

[22] Filed: Sep. 8, 1986

[51] Int. Cl.⁴ .............................................. B01F 3/04
[52] U.S. Cl. .............................. 261/94; 261/DIG. 72
[58] Field of Search ......................... 261/DIG. 72, 94

[56] References Cited

U.S. PATENT DOCUMENTS

| | | |
|---|---|---|
| D. 232,236 | 7/1974 | LaBorde ...................... 261/DIG. 72 |
| 2,212,932 | 8/1940 | Fairlie ......................... 261/DIG. 72 |
| 2,602,651 | 7/1952 | Cannon ....................... 261/DIG. 72 |
| 3,151,187 | 9/1964 | Comte .................................... 261/94 |
| 3,266,787 | 8/1966 | Eckert ........................ 261/DIG. 72 |
| 3,329,581 | 7/1967 | Wadman . |
| 3,430,934 | 3/1969 | Weishaupt ............................. 261/94 |
| 3,481,857 | 12/1969 | Gray . |
| 3,687,818 | 8/1972 | Porter et al. . |
| 3,752,453 | 8/1973 | Doyne ........................ 261/DIG. 72 |
| 3,785,780 | 1/1974 | Teichman et al. . |
| 3,912,634 | 10/1975 | Howell . |
| 3,924,807 | 12/1975 | Morgan ...................... 261/DIG. 72 |
| 4,028,442 | 6/1977 | Eckert . |
| 4,044,078 | 8/1977 | Curtis et al. . |
| 4,105,724 | 8/1978 | Talbot ........................ 261/DIG. 72 |
| 4,122,011 | 10/1978 | Strigle, Jr. ................. 261/DIG. 72 |
| 4,179,328 | 12/1979 | Barra et al. . |
| 4,184,857 | 1/1980 | Iijima et al. . |
| 4,304,738 | 12/1981 | Nutter . |
| 4,359,181 | 11/1982 | Chisholm . |
| 4,519,960 | 5/1985 | Kitterman et al. ......... 261/DIG. 72 |
| 4,537,731 | 8/1985 | Billet et al. ................. 261/DIG. 72 |
| 4,549,970 | 10/1985 | Ek et al. . |
| 4,557,876 | 12/1985 | Nutter . |
| 4,575,435 | 3/1986 | Kuhl ..................................... 261/94 |
| 4,581,299 | 4/1986 | Jager .......................... 261/DIG. 72 |

FOREIGN PATENT DOCUMENTS

| | | |
|---|---|---|
| 551071 | 5/1932 | Fed. Rep. of Germany ... 261/DIG. 72 |
| 253606 | 6/1926 | United Kingdom . |
| 427087 | 4/1935 | United Kingdom . |
| 734874 | 8/1955 | United Kingdom . |
| 977752 | 12/1964 | United Kingdom . |
| 1191498 | 5/1970 | United Kingdom .................. 261/94 |
| 2061127 | 10/1979 | United Kingdom . |

Primary Examiner—Tim Miles
Attorney, Agent, or Firm—Richard P. Crowley

[57] ABSTRACT

An expanded metal random packing for use in gas-liquid or liquid-liquid contact devices, which packing comprises: a longitudinal strip of expanded metal characterized by a plurality of generally uniformly disposed and defined spaces, the spaces defined by a plurality of struts having a one and an other end, and the ends of said longitudinal strip disposed inwardly about a vertical axis to form a partial or fully enclosed body of an expanded metal random packing.

31 Claims, 18 Drawing Figures

RANDOM PACKING FOR FLUID CONTACT DEVICES AND METHOD OF PREPARING SAID PACKING

FIELD OF THE INVENTION

The invention relates to expanded metal random or dumped packing particularly useful for gas-liquid or liquid-liquid contact devices, such as, but not limited to: packed towers; packing-tray columns; motionless or static mixers; and other gas-liquid or liquid-liquid contact devices.

BACKGROUND OF THE INVENTION

A wide variety of commercial random or dumped packings have been disclosed and used in gas-liquid contacting devices, such as, for example, packings having ring, cylinder, and saddle shapes and designs. Random or dumped packings are typically employed for gas-liquid contacting in chemical processing apparatuses, frequently columns or towers, which are partially or fully filled with the packing to provide intimate gas-liquid contact and wherein liquid is introduced at the upper portion of the column and flows downwardly as a thin film on the surface of the packing, while the vapors are introduced into the lower portion of the tower and ascend through the open spaces in the packing to provide for intimate contact between the liquid film on the surface of the packing and the vapor. Similarly, the packing can be used to obtain intimate contact between two immiscible liquids of different density as the lighter liquid rises while the heavier liquid falls through the bed of packing. Inter-fluid contact is employed for a variety of purposes, such as: mass transfer, for example distillation, scrubbing, stripping, extraction; chemical reaction; heat exchange; and mist elimination or deentrainment.

Thus, prior random packing elements have been formed of a variety of shapes, sizes and of various materials. Historically, the trend in the development of improved random or dumped packing elements has been directed to reducing the pressure drop of the packing. The reduction of pressure drop has usually been accomplished by creating a more open design in the packing in which the flat surfaces are broken up by punching holes, windows or the like in the material in order to reduce the pressure drop of the packing. This gives a packing with a lower pressure drop per unit of mass or heat transfer efficiency.

Expanded sheet material, such as expanded metal sheet material, has been employed in sheet form in a variety of gas-liquid contacting devices, such as packing material for a packed tower, or as a part of a distillation tray, or as a packing material involving a plurality of spaced apart plates. (See for example: U.S. Pat. No. 3,687,818 wherein spaced apart expanded metal sheets are employed as packing material in a distillation column; U.S. Pat. No. 4,028,442 wherein an expanded metal sheet is employed as a tower packing support plate; U.S. Pat. No. 4,184,857 wherein a stripping column contains a plurality of trays, the tray segments being formed of expanded-metal-type slits; and U.S. Pat. No. 4,304,738 wherein a packing material comprises stacked panels of expanded metal, the panels disposed at an angle from each other, the packing material being employed in packed columns and in motionless mixers).

Dumped tower packing elements having a saddle shape have been prepared employing expanded metal. For example, U.S. Pat. No. 4,519,960 discloses a tower packing element for vapor-liquid contact towers wherein the body of the saddle comprises expanded metal or metal that has been perforated, lanced and/or expanded. Also, U.S. Pat. No. 4,537,731 discloses a column packing for gas-liquid devices in the form of a saddle with a net-like matrix structure formed from a plurality of ribs having generally uniform openings.

It is desired to provide for an improved packing, particularly random or dumped packing, for use in gas-liquid or liquid-liquid contact devices, wherein the packing has lower pressure drop, higher capacity, and a lower pressure drop per theoretical stage than those packings currently available and to provide a packing which is easily manufactured at low cost.

SUMMARY OF THE INVENTION

The present invention concerns expanded metal packings and the method of manufacturing and using such packings, particularly in gas-liquid or liquid-liquid contact devices. In particular, the invention concerns expanded metal packings formed of a longitudinal strip which is formed into a packing body wherein a variety of sizes, shapes, and designs may be prepared and used in fluid contact devices.

An expanded metal random packing for inter-fluid contact devices, and particularly packed towers, has been discovered, which packing comprises a longitudinal strip of expanded metal, particularly where said strip comprises from about ½ to 2 full rows, or partial increments thereof, of fully or partially enclosed linearly disposed spaces of the expanded metal structure, and wherein said spaces are defined by strut elements having a one and the other end, and wherein generally the open area of the spaces is in excess of the facial area on one side of the strut elements. The packing comprises a partially or fully enclosed body wherein the ends of the longitudinal strip are disposed inwardly about a generally vertical axis and generally perpendicular to the axis of said longitudinal strip to form the partially or fully enclosed body of the packing element.

The expanded metal packing is employed generally as a random or dumped-type packing in a gas-liquid or liquid-liquid contacting device, such as a gas-liquid contacting tower, wherein the dumped packing may fully fill the tower or may form various layers on packing support trays, or be used alone or in combination with distillation trays or with other types of structured or nonstructured packing or trays in the column to obtain the desired inter-fluid contacting.

A wide variety of various shapes, sizes and structures may be formed of the longitudinal strip of expanded metal, for example where at least some of the one or the other strut ends are disposed inwardly toward the vertical axis and some are disposed outwardly. One packing element has one and the other strut ends disposed generally uniformly and sequentially inwardly and outwardly toward the vertical axis about the body of the packing element. The packing may comprise a body wherein one or the other strut ends are all disposed generally inwardly toward the vertical axis and wherein the strut ends are at an angle to the vertical axis or disposed generally perpendicular to the vertical axis. The packing element may comprise a generally spheroidal shaped body, a hemispheroidal shaped body, star shaped body and a variety of other open three-dimensional shapes. Typically, the longitudinal strip of expanded metal comprises from about 3 to 12, e.g. 4 to 8, defined spaces which make up the expanded metal random packing. The longitudinal strip employed may comprise a half, full, 1½ or up to 2 or more full rows or partial increments composed of a plurality of generally uniform spaces defined by the struts, such as, for example, a diamond, triangle, oval, or other shape. In one embodiment, the packing may comprise a single, full, or half row of enclosed linearly disposed spaces of the expanded metal material. Thus, the strut ends of each of the longitudinal strips may be bent either perpendicularly or at various angles to the vertical axis in any sort of a sequence inwardly and outwardly, or even just left generally parallel to the vertical axis, in the simplest embodiment, to form a packing element.

The method of forming the expanded metal random or dumped packing elements comprises forming a longitudinal strip of expanded metal from a strip of sheet metal, wherein the metal is separated into relatively narrow struts having substantially uniform width and interconnected to adjacent struts at the ends to define uniform, linearly disposed spaces in said expanded metal strip. The method includes optionally flattening the expanded metal strip, cutting the strip to form two strip ends having at least three uniform, linearly disposed spaces between said ends, and bending said strip ends generally toward each other about an axis generally perpendicular to the longitudinal axis of the strip to form a body having a partially or fully enclosed space within said longitudinal strip. The method also includes optionally bending the strut ends inwardly and outwardly with respect to the axis of rotation of the packing body.

The expanded metal packings so prepared may have a variety of polyhedral or curvelinear shapes. General examples of such shapes are hexagonal, circular, or eliptical cross sections, as well as spheroidal and toroidal shapes. The invention is intended and designed to cover all shapes and sizes formed from expanded longitudinal strips comprising one-half to two adjacent rows of linearly disposed, completely enclosed openings.

In one embodiment, the packing is made from a single row of generally diamond-shaped openings wherein the number of said openings may vary, for example, from 3 to 10, and may generally form a packing element of ½ to 3 inches in diameter.

Standard and flattened expanded metal sheets are manufactured in a variety of sizes with roughly diamond-shaped openings, and are typically used for gratings, catwalks, or belt guards. Decorative expanded metal sheets are also commercially available and are used in a wide variety of structural and decorative applications. The expanded sheet is formed in one piece and a solid sheet making a continuous rigid pattern of unbroken material without interlacing, tying, soldering or welding. It is recognized and a part of the contemplation of the invention that the packing can also be formed from any variety of commercially available expanded metal sheets by cutting strips of the expanded metal sheets before bending and forming the packing bodies as described herein.

It is also recognized and a part of the contemplation of the invention that the random packings may be formed of other than expanded metal, that is, expanded polymeric sheet material which is capable of being bent or otherwise formed into the packings as described herein.

The packing of the invention provides good mass transfer efficiency with very low pressure drop. Compared to conventional packing of equivalent size, for example, pall rings, the expanded metal packing can have a pressure drop which is only one-third as great. At the same time, the mass transfer efficiency is comparable to that for conventional packing. Thus, the packing of the invention has the desirable feature of a very low pressure drop per theoretical stage. It has also been found that the packing of the invention provides numerous drip points and great radial spreading of the liquid.

The invention will be described for the purposes of illustration only in connection with certain embodiments; however, it is recognized that various modifications, improvements and additions may be made by those persons skilled in the art, all falling within the spirit and scope of the invention.

DESCRIPTION OF THE EMBODIMENTS

Figure 1:
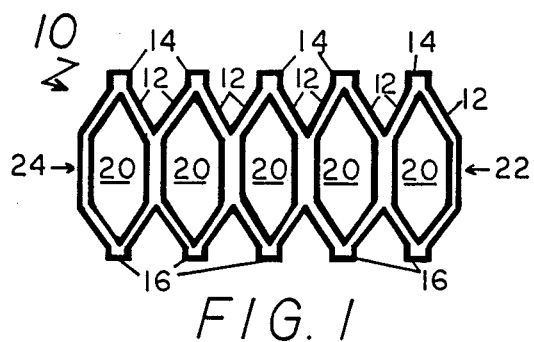
FIG. 1 is an elevation view of a flattened expanded metal longitudinal strip.

FIG. 1 is an elevation view of an expanded metal longitudinal strip 10 formed of a flattened expanded metal material with struts 12 defining a plurality of uniformly shaped diamond patterns and diamond spaces 20, the struts forming a plurality of spaces 20, with the struts having an upper end 14 and a lower end 16, and wherein the longitudinal strip 10 has a one end 22 and the other end 24, and as illustrated defines five diamond-like spaces. For the purpose of characterizing the orientation of the subsequent drawings, the longitudinal strip of FIG. 1 is envisioned to stand on the lower strut ends. Other drawings are indicated as "elevation" or "plan" with respect to this orientation.

Figure 2:
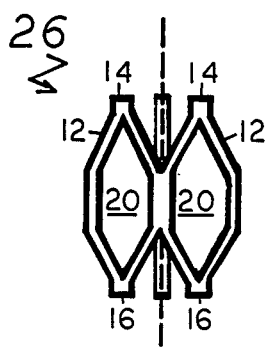
FIGS. 2 and 3 are elevation and plan views, respectively, of a packing formed from the strip of FIG. 1.
Figure 3:
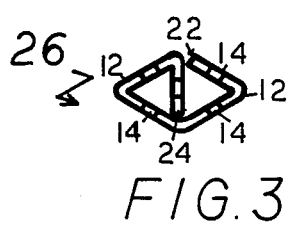

FIGS. 2 and 3 illustrate a simple form of an expanded metal packing 26 wherein the strip 10 of FIG. 1 has been bent about a vertical axis shown as a dashed line in FIG. 2 so that the ends 22 and 24 are bent toward each other, 24 being within the enclosed body, and wherein the upper and lower ends 14 and 16 of struts 12 are not bent but are contained in the upward vertical position of the original strip 10. The packing 26 thus forms a simple four-sided polyhedral closed packing body.

Figure 4:
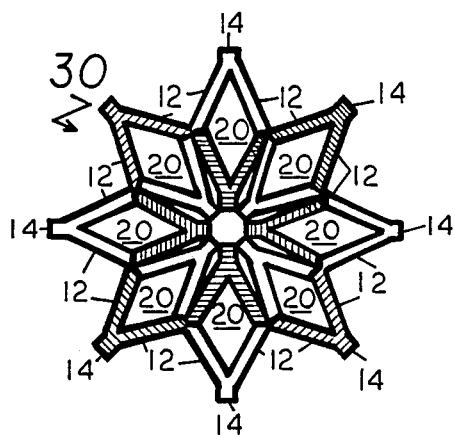
FIGS. 4 and 5 are plan and elevation views of a star-type packing formed from a strip similar to that of FIG. 1, but comprising eight diamond-shaped openings rather than five.
Figure 5:
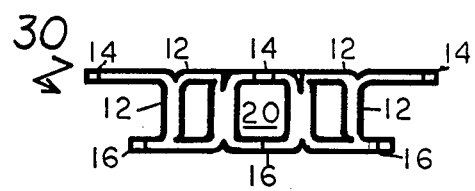

FIGS. 4 and 5 illustrate a star-shaped packing 30 wherein the ends of a strip similar to that of FIG. 1, but comprising 8 diamond-shaped openings, are bent toward each other in a polyhedral shape, and the star design is formed by bending in an alternative upper and lower opposing sequence the struts 12 inwardly toward and outwardly away from a central axis, the struts being bent at an angle of about 90° from the central axis. As illustrated, the struts 12 are bent at or about the point where the angular struts interconnect.

Figure 6:
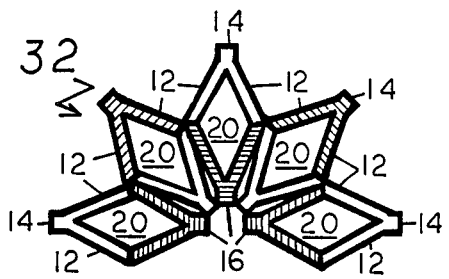
FIGS. 6 and 7 are plan views of another packing formed from a strip similar to that of FIG. 1.

FIG. 6 is a plan view of a packing 32 representing one-half of the packing 30 of FIGS. 4 and 5.

Figure 7:
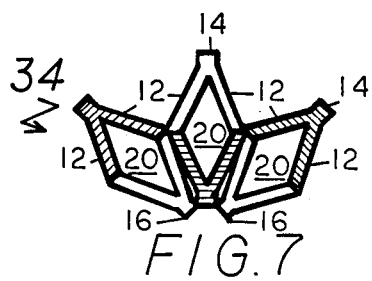

FIG. 7 is a plan view of a packing 34 representing only a three unit space 20 fraction of the star design packing 30 of FIGS. 4 and 5.

Figure 8:
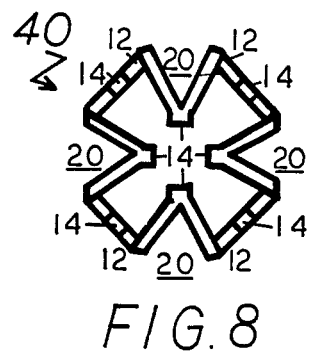
FIGS. 8 and 9 are plan and elevation views of another packing formed from a strip similar to that of FIG. 1.
Figure 9:
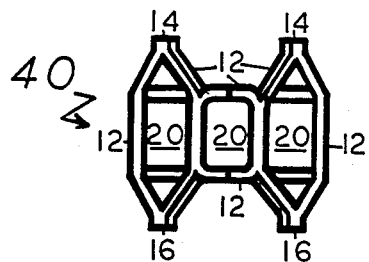

FIGS. 8 and 9 are plan and elevation views of a polyhedral type packing 40 with unit spaces 20 about a central vertical axis and with an alternating sequence of vertical and inwardly bent upper and lower struts 12, the bent struts 12 generally bent perpendicular to the central axis.

Figure 10:
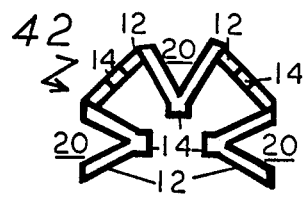
FIGS. 10 and 11 are plan views of two additional packings similar to FIGS. 8 and 9, but formed with five and three diamond-shaped openings respectively, rather than eight.

FIG. 10 is a plan view of a packing 42 representing one-half of the packing 40 of FIGS. 8 and 9.

Figure 11:
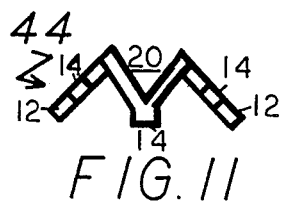

FIG. 11 is a plan view of a packing 44 which represents only a three unit space 20 fraction of the packing 40 of FIGS. 8 and 9.

Figure 12:
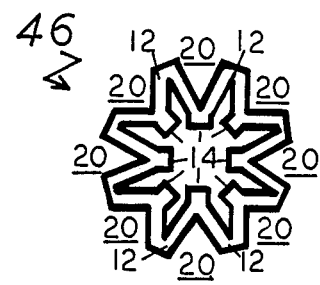
FIGS. 12 and 13 are plan and elevation views of another packing formed from a strip similar to that of FIG. 1, but comprising eight diamond-shaped openings, rather than five.
Figure 13:
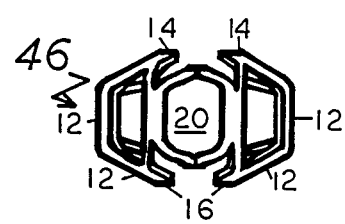

FIGS. 12 and 13 are plan and elevation views of a spheroidal packing 46 wherein all of the upper and lower struts 12 are bent inwardly toward a central vertical axis alternating between struts 12 bent generally perpendicular to the axis and struts 12 bent at an angle of about 45° toward the axis.

Figure 14:
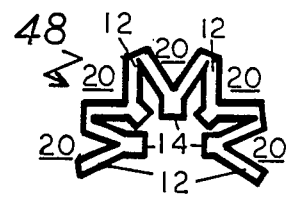
FIGS. 14 and 15 are plan and elevation views of two additional packings similar to FIGS. 12 and 13, but formed with five and three diamond-shaped openings respectively, rather than eight.

FIG. 14 is a plan view of a packing 48 which represents one-half of the spheroidal packing 46 of FIGS. 12 and 13.

Figure 15:
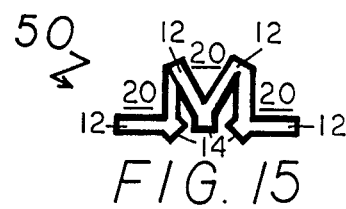

FIG. 15 is a plan view of a packing 50 which represents a three unit space 20 portion of the spheroidal packing 46 of FIGS. 12 and 13.

Figure 16:
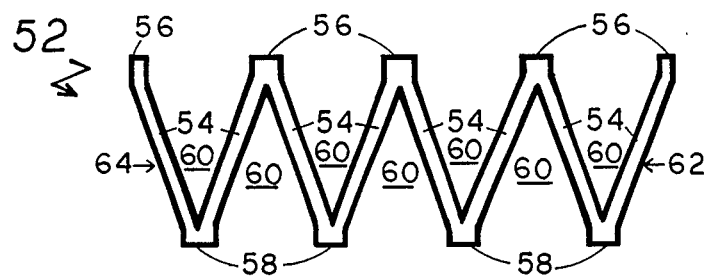
FIG. 16 is an elevation view of a half row of a longitudinal strip of flattened expanded metal.

FIG. 16 is an elevation view of an expanded metal half strip 52 having struts 54, upper strut ends 56, and lower strut ends 58, defining triangular open spaces 60 and having a one end 62 and an other end 64. The strip 52, like the strip 10 of FIG. 1, is designed to be formed about a central vertical axis into a three-dimensional body packing element by bending ends 64 and 62 toward each other and bending struts 54 at one end 56, or the other end 58, or both ends.

Figure 17:
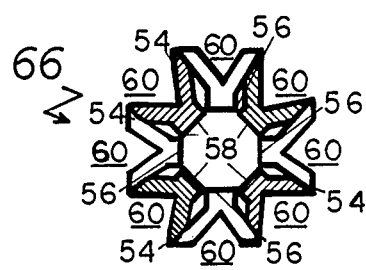
FIGS. 17 and 18 are plan and elevation views of a spheroid-type packing formed from the half strip of FIG. 16.
Figure 18:
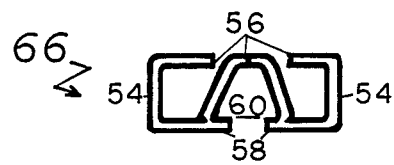

FIGS. 17 and 18 are plan and elevation views of a spheroidal-type packing 66, wherein the adjoining struts 54 are all bent at upper and lower positions toward a central vertical axis and generally perpendicular to the axis to form an enclosed packing body.

As an example of the performance of one of the embodiments of the packing of this invention, the packing of FIGS. 12 and 13 was tested in a small column for pressure drop and efficiency. For comparison, identical tests were conducted in the same equipment with conventional one-inch pall rings. The nominal size of the two packings was about the same. At various flow rates of ambient air, the pressure drop was measured across a 2-foot-high bed of packing with an inclined water manometer. The efficiencies of the packings were measured, also for a 2-foot-high bed of packing, using a 2N sodium hydroxide solution to absorb $SO_2$ from air at ambient conditions using countercurrent flow through the packed bed.

Results are compared in the following Table for the packing of FIGS. 12 and 13 and for conventional 1-inch pall rings. The pressure drop is shown for the dry packing at an air velocity of 5.48 feet/second. The pressure drop for the packing of this invention is only about one-third of the pressure drop of conventional packing. The $SO_2$ removal efficiency across the 2-foot bed at a liquid loading of 3 gpm/feet$^2$ and a gas velocity of 7.3 feet/second is also shown in the Table. The $SO_2$ removal efficiency at these conditions was significantly greater for the packing of this invention. Also shown in the Table is the HTU (height of a transfer unit: the height of packing required to achieve a specified amount of mass transfer). The ratio of HTU values indicates that, at these conditions, conventional packing requires a packed bed which is 26 percent higher than that for the packing of this invention in order to achieve the same amount of mass transfer.

TABLE

| | Comparison of Packing Performance | | |
|---|---|---|---|
| PACKING | DRY PRESSURE DROP AT 5.48 FT./SEC. IN. WATER/FT. | $SO_2$ REMOVAL EFFICIENCY PERCENT | HTU FT. |
| Packing of FIGS. 12 & 13 | 0.081 | 89.4 | 0.89 |
| Conventional 1-inch pall rings | 0.230 | 83.2 | 1.12 |

As illustrated, a wide variety of open three-dimensional, enclosed-body packing elements can be prepared from expanded sheet strips in a variety of shapes, forms and sizes.

What is claimed is:

1. A random packing for gas-liquid or liquid-liquid contact, which packing consists essentially of:
   (a) a longitudinal strip of expanded sheet material having a one end and another end and having at least three generally uniform linearly disposed spaces in said strip, in the form of only one to about two full rows, wherein there is at least one full row of enclosed spaces, said strip having struts defining said spaces, and said struts having a one and an other end; and
   (b) the ends of said longitudinal strip disposed about a vertical axis generally perpendicular to the longitudinal axis of said strip to form a partially or fully enclosed packing body.

2. The packing of claim 1 wherein the expanded sheet material comprises an expanded metal sheet material.

3. The packing of claim 1 wherein at least some of the one or other strut ends are disposed inwardly toward the said vertical axis.

4. The packing of claim 1 wherein the one or the other or both strut ends are disposed generally uniformly and sequentially inwardly toward and outwardly from the said vertical axis.

5. The packing of claim 1 wherein the one and other strut ends are of uniform width and are all disposed generally inwardly toward the said vertical axis.

6. The packing of claim 1 wherein the said packing comprises a generally star-like or star fragment shaped body.

7. The packing of claim 1 wherein the said packing comprises a generally spheroidal or spheroidal fragment shaped body.

8. The packing of claim 1 wherein said one and other strut ends are all disposed inwardly toward the said vertical axis, with alternate strut ends disposed inwardly at about 90° from the said vertical axis, and strut ends adjacent to said alternate strut ends disposed inwardly at an angle of less than 90° toward the said vertical axis to form a generally spheroidal or hemispheroidal packing body.

9. The packing of claim 1 wherein the said spaces range from about 3 to 12.

10. The packing of claim 1 wherein said strip comprises only a single full row of fully enclosed, linearly disposed spaces of the expanded sheet material.

11. The packing of claim 1 wherein the open area of said spaces is in excess of the facial area of one side of the said struts.

12. The packing of claim 1 which comprises a polyhedral packing body with one end of said strip extending inwardly and across an interior space of said closed packing body.

13. The packing of claim 1 wherein the enclosed spaces in said strip are hexagonal or diamond spaces.

14. The packing of claim 1 wherein said struts are of uniform width and interconnected to adjacent struts to define said uniform enclosed spaces in said strip.

15. The packing of claim 1 wherein the one or the other strut ends, or both ends, are disposed generally uniform and sequentially parallel to and inwardly toward or outwardly from the said vertical axis.

16. The packing of claim 15 wherein the one and other ends of the same struts are generally uniform and sequentially all disposed inwardly at different angles toward the said vertical axis.

17. The packing of claim 1 wherein one and other strut ends are disposed generally uniformly and sequentially inwardly toward and outwardly from the said vertical axis to form a star-shaped packing.

18. The packing of claim 1 wherein the one and other ends of the struts are disposed inwardly toward said vertical axis at the about the same angle to form a spheroidal-shaped packing.

19. A gas-liquid or liquid-liquid contact device which contains a plurality of the packings of claim 1.

20. A random packing for gas-liquid or liquid-liquid contact which packing comprises:
  (a) a longitudinal strip of expanded sheet metal material having one and an other end and having from 3 to 12 generally uniform, linearly disposed and defined spaces in said strip, said strip having only one full row of enclosed spaces of uniform width, said strip having substantially uniformly wide struts to define said spaces, the struts having a one and an other end to form drip points; and
  (b) the ends of said strip disposed inwardly about a vertical axis generally perpendicular to the longitudinal axis of said strip to form a partial or fully enclosed packing body, and all of the one and other ends of the struts disposed inwardly toward the said vertical axis.

21. The packing of claim 20 wherein the one and other ends of the same struts are uniformly and sequentially disposed inwardly toward the said vertical axis at an angle of about 90°, and adjacent struts are disposed inwardly toward said vertical axis at an angle of less than 90°.

22. A method of forming a random packing of expanded sheet material for gas-liquid or liquid-liquid contact, which method comprises:
  (a) forming a longitudinal strip having a one and other end and having at least three, generally uniform, linearly disposed spaces in said strip, in the form of only one to two rows, with at least one row of fully enclosed spaces, said strip having struts to define said spaces and the struts having a one and an other end; and
  (b) forming said strip about a vertical axis to direct the one and other ends of said strip generally toward each other and generally perpendicular to the axis of said strip, to form a packing body having partially or fully enclosed space within said strip.

23. The method of claim 22 wherein the expanded sheet material comprises an expanded metal sheet material.

24. The method of claim 22 which includes forming the one or other ends of the struts or both ends of the same or different struts inwardly toward or outwardly away from the said vertical axis.

25. The method of claim 24 which includes generally uniformly and sequentially bending the one and other ends of the struts inwardly toward and outwardly away from the vertical axis.

26. The method of claim 22 wherein said strip comprises only one full row of spaces and which includes bending sequentially the one end of the struts inwardly toward and the other end of the same strut outwardly from the vertical axis to produce a fully enclosed, star-shaped packing.

27. The method of claim 22 which includes bending one end of said strip inwardly and across the interior of the enclosed space of said packing body.

28. The method of claim 22 which includes generally uniformly and sequentially bending the one and other strut ends inwardly at an angle of about 90° from said vertical axis and the adjacent one and other strut ends inwardly at an angle of less than about 90° to form a spheroidal-shaped packing.

29. The packing prepared by the method of claim 22.

30. A random packing body for use in a fluid contact device, which body comprises:
  (a) a plurality of uniformly narrow struts having a one end and other end to form drip points and said struts forming a network of struts which surround and define a plurality of generally uniform spaces;
  (b) connecting means connecting said struts to adjacent struts to form a chain of said network;
  (c) at least three of said spaces disposed about a vertical axis of rotation to form a partially or fully enclosed packing body, said axis generally perpendicular to a plane containing said connecting means and defining strut ends above and below said plane; and
  (d) the one strut ends disposed sequentially inwardly and outwardly above said plane and the corresponding other strut ends below said plane are disposed sequentially outwardly and inwardly with respect to the said axis to form a star-shaped packing body.

31. A random packing body for use in a fluid contact device, which body comprises:
  (a) a plurality of uniformly narrow struts having a one end and an other end to form drip points and said struts forming a network of struts which surround and define a plurality of generally uniform spaces;
  (b) connecting means connecting such struts to adjacent struts to form a chain of said network;

(c) at least three of said spaces disposed about a vertical axis of rotation to form a packing body, said axis generally perpendicular to a plane containing said connecting means and defining strut ends above and below said plane; and
(d) the one and the other strut ends all disposed inwardly toward the said axis of rotation to form a generally spheroidal packing body,
(e) and wherein the one strut ends above said planes are disposed sequentially inwardly toward said axis at an angle of about or approaching 90°, and the other strut ends are disposed inwardly towrd said axis at an angle of less than or approaching 90° to form a fully enclosed spheroidal-type packing body.

* * * * *